Figure 1:
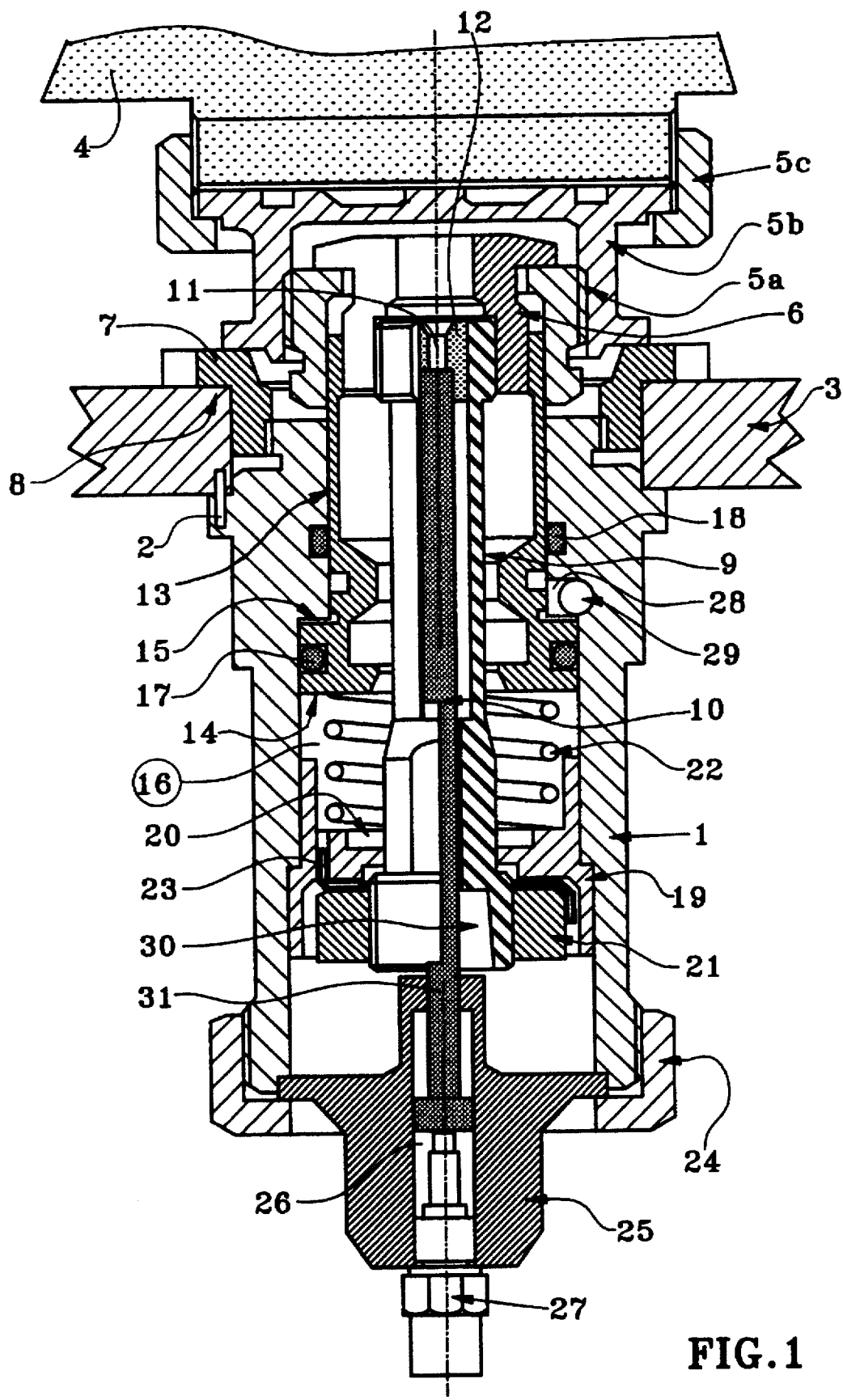

United States Patent [19]

Aubret

[11] Patent Number: 5,671,650

[45] Date of Patent: Sep. 30, 1997

[54] SLOTTED NUT TYPE RELEASING DEVICE FOR A MICROSATELLITE, WITH FULL MECHANICAL AND PYROTECHNICAL REDUNDANCY

[75] Inventor: Jean-Pierre Aubret, Saint Medard en Jalles, France

[73] Assignee: Aerospatiale Societe Nationale Industrielle, Paris, France

[21] Appl. No.: 677,431

[22] Filed: Jul. 2, 1996

[30] Foreign Application Priority Data

Jul. 13, 1995 [FR] France ............... 95 08502

[51] Int. Cl.⁶ ...................................... F42B 15/36
[52] U.S. Cl. ........................... 89/1.14; 102/378
[58] Field of Search ............... 89/1.14; 102/377, 102/378

[56] References Cited

U.S. PATENT DOCUMENTS

| | | | |
|---|---|---|---|
| 3,120,149 | 2/1964 | Dickie | 89/1.14 |
| 3,176,573 | 4/1965 | Dickie | 89/1.14 |
| 3,196,745 | 7/1965 | Sustrich et al. | |
| 3,262,351 | 7/1966 | Webb | 89/1.14 |
| 3,431,854 | 3/1969 | Rabenhorst | |
| 3,754,496 | 8/1973 | Noel | 89/1.14 |
| 3,910,154 | 10/1975 | Gardner | 89/1.14 |
| 4,929,135 | 5/1990 | Delarue et al. | 102/378 |

FOREIGN PATENT DOCUMENTS

| | | |
|---|---|---|
| 0 363 242 | 4/1990 | European Pat. Off. . |
| 2 707 750 | 1/1995 | France . |
| 82/02527 | 8/1982 | WIPO . |

*Primary Examiner*—Michael J. Carone
*Assistant Examiner*—Theresa M. Wesson
*Attorney, Agent, or Firm*—Nikaido, Marmelstein, Murray & Oram LLP

[57] ABSTRACT

An inner piston (10) is housed inside a petalled pin (9) and a releasing piston (13) in the form of a sleeve placed outside the said petalled pin form the sliding pieces that maintain the connection between a satellite base and a rocket platform, via a slotted nut (6) and connecting pieces (5).

A pyrotechnical initiator (27) is provided in a shock absorber (25) at the base of the releasing device, and a detonating line (29) is placed above the base of the releasing piston.

12 Claims, 2 Drawing Sheets

SLOTTED NUT TYPE RELEASING DEVICE FOR A MICROSATELLITE, WITH FULL MECHANICAL AND PYROTECHNICAL REDUNDANCY

The invention relates to the technical field of devices for connecting and separating objects such as microsatellites, in relation to a structure, using a fluidic releasing energy with full redundancy permitting two independent modes of mechanical separation.

There exist numerous devices for placing a satellite in orbit from a rocket, and the purpose of which is to release the satellite from its support and to separate it swiftly therefrom by ejection.

Independently of the known ejection systems, the single-point separation devices are not entirely reliable, either because there remain common failure modes in connection with their propulsion means, that is to say the releasing devices themselves, or in connection with their initiation, for example using explosive bolts, or because they are incapable of operating so as to provide the same separation interface in normal mode and in emergency mode, or again, in simultaneous mode.

Among the known separating devices, U.S. Pat. Nos. 3,120,149 and 3,176,573, in particular, disclose explosive bolts operating according to the principle of the failure of a part in a defined weak zone. However, these releasing devices, owing to the failure of a breakable element, induce a shock which is applied to the satellite at the time it is ejected, which can be harmful to the equipment on board.

On the other hand, there is known, for example from document EP-A 0 363 242 in the name of the Applicant, a so-called slotted nut type device, which ensures the temporary connection of two elements to one another, comprising a male element connected to one of the elements and a female element connected to the other, this female element comprising, in a hollow body that is elongated along one axis, a retaining sleeve adapted to contract axially on the male element or to expand, with a piston sliding axially to manoeuver the said retaining sleeve in contraction or expansion, and, in the piston, an ejecting finger which is connected thereto by a breakable member.

In this device, we encounter the same drawback as in the case of the explosive bolt systems; furthermore, it does not offer full redundancy with regard to propulsion means or mechanics.

This has induced the Applicant to develop a system operating according to the principle of the slotted nut, which, furthermore, provides the same separation interface in both normal mode and emergency mode.

The invention thus relates to a slotted nut type releasing device for a microsatellite, with full mechanical and pyrotechnical redundancy, in which the head of a slotted nut ensures connection between a satellite base and a rocket platform, this connection being maintained by sliding pieces capable of being displaced and of thus releasing the connection upon implementation of a releasing energy of the type provided by a pyrotechnical initiator, a releasing device wherein the sliding pieces are formed by an inner piston housed inside a petalled pin, and by a releasing piston in the form of a sleeve, placed outside the said petalled pin, and wherein the body of the releasing device is provided with two generators of releasing energy, each acting on one or the other of the sliding pieces, in such a way as to detach the slotted nut and its connecting pieces at the base of the satellite.

According to one particular feature of the invention, the releasing piston forms, on its lower end, an annular edge coming to bear against a shoulder of a chamber internal to the body of the releasing device.

Furthermore, the lower end of the petalled pin passes through the central orifice in a spacer capable of sliding inside the body, a spring being compressed between the lower face of the releasing piston and the upper face of the spacer.

According to another advantageous Feature of the invention, the impact of the petalled pin is attenuated at the end of its stroke by a shock absorber held on the base of the chamber internal to the body of the releasing device.

Advantageously, the releasing energy generators are formed by a pyrotechnical initiator housed at the base of a central shaft provided in the shock absorber, and by at least one detonating line placed above the base of the releasing piston.

Further features and advantages of the invention will emerge from the following description of two forms of embodiment serving as examples, wherein reference is made to the annexed drawings, which show:

FIG. 1 a vertical cross-sectional view of a releasing device; and

Figure 2:
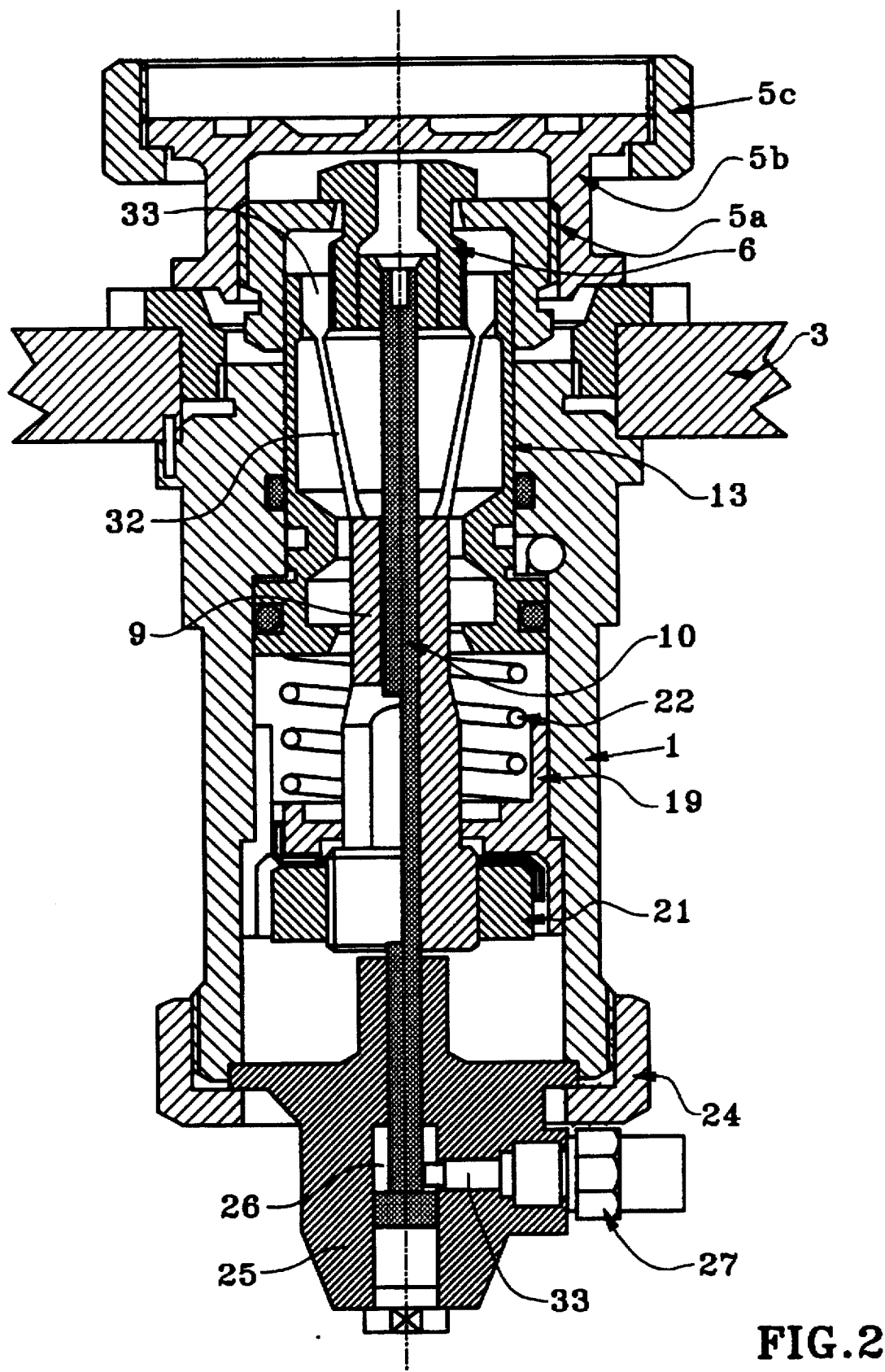

FIG. 2 an alternative embodiment of the releasing device according to FIG. 1, in cross-sectional view.

FIG. 1 shows a body 1 of a releasing device integral, by means of a connection 2, with a structure 3 which forms part of a rocket platform. A satellite base 4 is connected by threaded connecting pieces 5(*a* to *c*) to a slotted nut 6 the head of which bears against the lowermost connecting piece 5*a*.

Intermediate connecting piece 5*b* itself rests on a connecting nut 7, a circular shoulder 8 of which is pressed against structure 3. The internally threaded base of the three or four-part slotted nut is held in engagement on the end of a petalled pin 9 which itself surrounds an inner piston 10, the end of which is screwed, by means of a screw 11, to an end piece 12 which is capable of sliding inside the petalled pin. The petalled pin is hollowed out at its base to form an axial notch 30 having upwardly orientated, inclined faces.

The upper end of a releasing piston 13 taking the form of a sleeve encircles the portion of slotted nut 6 which is screwed onto the petal led pin 9. The top of the releasing piston is intercalated between the slotted nut and the lowermost connecting piece 5*a*. Releasing piston 13 Forms, at its lower end, an annular edge 14 which comes to bear against a shoulder 15 provided in chamber 16, internal to body 1 of the releasing device. The releasing piston thus closes the said chamber, tightness being ensured by a seal 17 housed in an annular groove formed on the outer peripheal edge of the piston, and by a seal 18 housed in a annular groove formed in the inner portion of the ejector body 1.

A spacer 19 capable of sliding inside body 1 is pierced by a central orifice 20, through which passes the lower end of petalled pin 9. A tensioning nut 21 screwed onto this threaded lower end of pin 9 bears against the lower face of spacer 19. It is immobilized against rotation by a locking tab 23. A spring 22 is compressed between the lower face of releasing piston 13 and the upper face of spacer 19.

The lower opening in chamber 16 is closed by a closure nut 24, inside which is held a shock absorber 25. The peripheral edge of the said shock absorber is held between the base of the ejector body and the nut at the time the latter is screwed on. The shock absorber is provided with a central pin 31 rising inside chamber 16, the walls of which are inclined to correspond to the profile of notch 30 of the petal led pin.

Inner piston 10 extends downwardly inside the petalled pin and penetrates the inside of a central shaft 26 provided in the shock absorber. At the base of the central shaft is housed the pyrotechnical initiator 27, formed by an igniter or a detonater.

Above the base of releasing piston 13, there is provided, in ejector body 1, a small chamber 28 communicating with other detonating lines 29.

FIG. 1 shows the mechanism prior to triggering of the release.

In normal operation, as soon as the order to eject the satellite has been transmitted, firing of detonating line 29 is triggered. The gases produced then build up in small chamber 28 and act on releasing piston 13, pushing it downwards. This movement releases slotted nut 6, the threaded portions of which can separate from one another and release petalled pin 9. During its downward movement, the releasing piston will come into abutment, by compressing spring 22, with the top of spacer 19 which, via nut 2, will drive petalled pin 9 downwards. At the end of the stroke of the said pin, its notch 30 with inclined faces engages the shaped pin 31 of the shock absorber, and the impact of pin 9 is thus attenuated before it is blocked and immobilized on the shock absorber. The relative flexibility of the latter also contributes to this shock absorbing operation.

As base 4 is no longer held on structure 3 by the releasing device, that is to say by the slotted nut and its connecting pieces, spring 22 exerts a thrusting force upon the base freed of its connecting pieces 5, and the satellite separates from the platform at the required velocity.

This normal release results from normal operation of detonating lines 29.

In the event of these detonating lines failing to operate, there is an automatic change-over to emergency mode. In this case, pyrotechnical initiator 27 is fired.

The gases thus produced in chamber 26 will cause a sudden upward movement of inner piston 10 and, as a result, end piece 12 will thus release the petals of petalled pin 9. Consequently, the end of the said pin is no longer engaged with the thread of slotted nut 6, and it can be inwardly released therefrom; spring 22, exerting its pressure on spacer 19, causes downward displacement of the latter, as well as of the mobile unit to which it is attached, namely tensioning nut 21, as well as petalled pin 9 itself. The latter's impact on shock absorber 25 is attenuated in the same way as in normal operation. Also according to tile same process, the slotted nut releases base 4 of the satellite.

The device can also operate with simultaneous use of the two pyrotechnical motorization systems (27, 29).

FIG. 2 illustrates an alternative embodiment in which the same elements bear the same reference numbers as in FIG. 1. The modifications in relation to the previous embodiment concern the following points:

The upper portion of petal led pin 9 has the shape of a tulip 32, ending in an internally threaded crown 33, which is intercalated between slotted nut 6 and releasing piston 13. The crown is in sliding contact with the said piston, but in engagement with the internally threaded base of slotted nut 6.

The other modification concerns shock absorber 25. This time, the pyrotechnical initiator 27 is located on the side of the shock absorber and communicates, through a circuit 34, with central shaft 26.

Operation in normal mode, emergency mode or in simultaneous mode is entirely identical here with that of the previous case.

I claim:

1. A slotted nut releasing device for a microsatellite, with full mechanical and pyrotechnical redundancy, wherein a head of a slotted nut ensures connection between a satellite base and a rocket platform, this connection being maintained by sliding pieces capable of being displaced and of thus releasing the connection upon implementation of a releasing energy provided by a pyrotechnical initiator, wherein the sliding pieces are formed by an inner piston housed inside a petalled pin, and by a releasing piston (13) in the form of a sleeve, placed outside the said petalled pin, in that the petalled pin is connected by a thread to slotted nut and in that a body of the releasing device is provided with two generators of releasing energy, each acting on one or the other of the sliding pieces, to detach the slotted nut and its connecting pieces at the base of the satellite.

2. A releasing device according to claim 1, wherein the end of the inner piston is screwed onto an end piece sliding inside the petalled pin.

3. A releasing device according to claim 1, wherein the petalled pin is hollowed out at its base to form an axial notch with upwardly orientated inclined faces.

4. A releasing device according to claim 1, wherein the top of the releasing piston is intercalated between the slotted nut and a lowermost connecting piece at the base of the satellite.

5. A releasing device according to claim 1, wherein the petalled pin has the shape of a tulip ending in an internally threaded crown, which is intercalated between the slotted nut and the releasing piston.

6. A releasing device according to claim 1, wherein the releasing piston forms, at its lower end, an annular edge coming to bear against a shoulder of a chamber internal to the body of the releasing device.

7. A releasing device according to claim 1, wherein the lower end of the petalled pin passes through the central orifice of a spacer capable of sliding inside the body, and in that a spring is compressed between the lower face of the releasing piston and the upper face of the spacer.

8. A releasing device according to claim 7, wherein a tensioning nut, screwed onto the threaded lower end of the petalled pin, beam on the lower face of the spacer.

9. A releasing device according to claim 6, wherein the impact of the petalled pin is attenuated at the end of its stroke by a shock absorber held on the base of the chamber internal to the body of the releasing device.

10. A releasing device according to claim 9, wherein the shock absorber is provided with a central pin rising inside the chamber, and wherein walls of the central Pin are inclined to correspond to the profile of a notch of the petalled pin.

11. A releasing device according to claim 9, wherein the releasing energy generators are formed by a pyrotechnical initiator housed in the base of a central shaft provided in the shock absorber, and by at least one detonating line placed above the base of the releasing piston.

12. A releasing device according to claim 11, wherein the pyrotechnical initiator is located on the side of the shock absorber and communicates with the central shaft.

* * * * *